United States Patent [19]

Gay et al.

[11] Patent Number: 4,934,501
[45] Date of Patent: Jun. 19, 1990

[54] POWER TRANSMISSION WITH A CLUTCH UNIT HAVING SHAFT SPEED MEASURING MEANS

[75] Inventors: Christian Gay, Amiens; Philippe Lazziaz, Levallois-Perret, both of France

[73] Assignee: Valeo, Paris, France

[21] Appl. No.: 345,357

[22] Filed: May 1, 1989

[30] Foreign Application Priority Data

May 6, 1988 [FR] France ............................... 88 06103

[51] Int. Cl.⁵ .................................................. F16D 13/50
[52] U.S. Cl. .................................. 192/70.27; 192/30 W
[58] Field of Search .................... 192/30 W, 70.27, 98, 192/103 R; 73/493, 494; 324/160

[56] References Cited

U.S. PATENT DOCUMENTS

| 4,474,274 | 10/1984 | Lutz et al. | 192/30 W |
| 4,493,409 | 1/1985 | Steeg | 192/30 W |
| 4,632,231 | 12/1986 | Hattori et al. | 192/103 R X |

FOREIGN PATENT DOCUMENTS

| 2376335 | 7/1976 | France . | |
| 2513721 | 4/1983 | France . | |
| 2523743 | 9/1983 | France . | |
| 2531511 | 2/1984 | France . | |
| 2533650 | 3/1984 | France . | |
| 58-163828 | 9/1983 | Japan | 192/30 W |
| 2144810 | 3/1985 | United Kingdom | 192/30 W |
| 2161574 | 1/1986 | United Kingdom . | |

Primary Examiner—Leslie A. Braun
Assistant Examiner—Nicholas Whitelaw
Attorney, Agent, or Firm—Charles E. Brown; Charles A. Brown

[57] ABSTRACT

In a power transmission comprising a driving shaft and a driven shaft coupled through a clutch unit, the rotational velocities of the shafts are measured by two sensors mounted on the declutching member which slides on the driven shaft to actuate the clutch diaphragm. The sensors may for example be of the variable reluctance type, and are positioned so as to face a portion of the driven shaft and another part of the driving shaft which comprise at least one element or structural feature to which the sensors are responsive, such as ribs or grooves constituting a kind of "pinion" of the driven shaft and a finger which is fixed with respect to the cover plate of the clutch, the latter being itself rotatable with the driving shaft. This "pinion" may be modified so as to allow the degree of wear of the clutch friction pads to be measured.

9 Claims, 2 Drawing Sheets

POWER TRANSMISSION WITH A CLUTCH UNIT HAVING SHAFT SPEED MEASURING MEANS

FIELD OF THE INVENTION

This invention relates to a power transmission of the kind comprising a clutch unit having means for measuring the speed of two shafts, namely a driving shaft and a driven shaft, arranged to be releaseably coupled together by the clutch unit, and is especially applicable to automotive vehicles The invention is specifically directed to the measurement of certain parameters, mainly including, but not restricted to, the speed of rotation of the driven shaft and that of the driving shaft.

BACKGROUND OF THE INVENTION

In an automotive vehicle, friction clutches of automatic transmissions are known in which the clutch pedal is absent, the clutch unit being actuated via an electric motor controlled as a function of the values of certain operating parameters of the vehicle. These parameters of course include the rotational velocities both upstream and downstream of the clutch. Measurement of these velocities has hitherto been obtained by the use of certain of the gear wheels in the gearbox, together with the engine crank shaft, which involves making comparatively expensive modifications to the gearbox and the engine casing. This concept is particularly well illustrated by the clutch unit disclosed in an article in the periodical "Argus Automobile" of Apr. 21st, 1988, or in an article in the issue of "Popular Science" for March 1988.

It will be realised that the arrangement of the necessary sensors calls for additional mechanical operations during manufacture and also for some adaPtation in the mounting of the gearbox and engine casings.

SUMMARY OF THE INVENTION

A main object of the invention is to overcome this problem, that is to say to obtain the required information about shaft speeds without modification of the engine and gearbox. The invention is based on the concept of providing measuring means, and in particular measuring means for shaft speeds, on the declutching member which is mounted slideably around the driven shaft, so as to constitute with the declutching member a sub-assembly which is independent and complete in itself.

More particularly, the invention concerns a power transmission comprising a driving shaft, a driven shaft mounted end to end with the driving shaft on a common axis of rotation therewith, and a clutch unit interposed between the said shafts, the clutch unit comprising a reaction plate coupled to the driving shaft for rotation therewith, a cover plate fixed to the said reaction plate, a pressure plate coupled with the cover plate for rotation therewith, a friction disc between the reaction plate and the pressure plate, resilient biassing means associated with the pressure plate for urging the latter towards the reaction plate to couPle the pressure plate and reaction plate together through the friction disc, whereby to engage the clutch so that the said driving shaft is coupled with the said driven shaft to drive the latter, declutching lever means associated with the resilient biassing means, and a declutching member mounted centrally and operatively engaging the declutching lever means to actuate the resilient biassing means for engagement and disengagement of the clutch. According to the invention, in such a power transmission, the declutching member comprises a manoeuvring element and a declutching element carried by the manoeuvring element, the clutch unit further comprising means mounting the manoeuvring element for axial movement under the action of a control member, and two speed sensors carried by the said manoeuvring element, each speed sensor being oriented towards an element selected from a respective one of the said shafts and any element rotatable with the respective said shaft, the element towards which each sensor is oriented comprising at least one element to which the respective sensor is responsive. In respect of each of the shafts, the said element towards which the corresponding sensor is oriented, and to which it is sensitive, comprises either the shaft itself or at least one element or structural feature carried bY the shaft or forming part of the latter, and will be referred to as a "sensed element".

It will be appreciated in the light of the two prior art articles mentioned above, that the length of the output leads from the sensors can be reduced, and that these can pass through the clutch casing wherever may be most convenient.

In one particularly advantageous embodiment of the invention, the said sensed element towards which the speed sensor associated with the driving shaft is oriented comprises a rotatable finger projecting from the cover plate so as to be rotatable with the reaction plate.

In another embodiment, the sensor associated with the driving shaft is disposed on the manoeuvring element, so as to be substantially perpendicular to the longitudinal axis of the latter.

The sensed element of the driven shaft preferably comprises at least one rib or groove formed longitudinally on the surface of the driven shaft. Preferably there are a plurality of such ribs or grooves If such ribs or grooves are regularly disposed about the circumference of the shaft, a kind of "pinion" is obtained. This extends over a sufficient part of the length of the shaft to be in view of the sensor over the whole of its travel during longitudinal displacement of the declutching member along the driven shaft. Since the end of the driven shaft usually carries a drive pinion with which the friction disc of the clutch engages, the latter being axiallY slideable on this pinion, the other "pinion" mentioned above (comprising the said ribs) and the drive pinion may be made similar to each other; and their ribs or teeth may in particular be aligned with each other and formed in a single cutting operation. Furthermore, the two pinions may even be combined, the only modification to the driven shaft then being simply that the length of the drive pinion, whereby the driven shaft is driven by the friction disc, is extended so as to lie opposite the speed sensor for the driven shaft.

A further object of the invention is to obtain benefit from this arrangement so as to enable another parameter of the clutch, namely wear in the friction pads, to be measured. This wear results in variation in the travel of the declutching member along the driven shaft when the clutch is in its disengaged position It is then enough for the sensed element associated with the speed sensor of the driven shaft to be made so that it is not constant in the longitudinal direction, in the sense that the sensor will then deliver output signals responsive to its longitudinal position on the shaft and therefore of the degree of wear in the pads. For example, the above mentioned ribs or grooves may be made conical about the shaft axis. In this case, variation in the position of the declutching member results in corresponding variation in the amplitude of the output signal from the sensor. The output signals from the driven shaft sensor can then easily be used in order to provide two types of data, i.e. data on driven shaft velocity and data on friction disc wear.

The invention will be more clearly understood, and further advantages of the invention will appear more clearly, in the light of the description which follows. Several embodiments in accordance with the invention will be described, by way of example only and with reference to the accompanying drawings.

DESCRIPTION OF PREFERRED EMBODIMENTS

Figure 1:
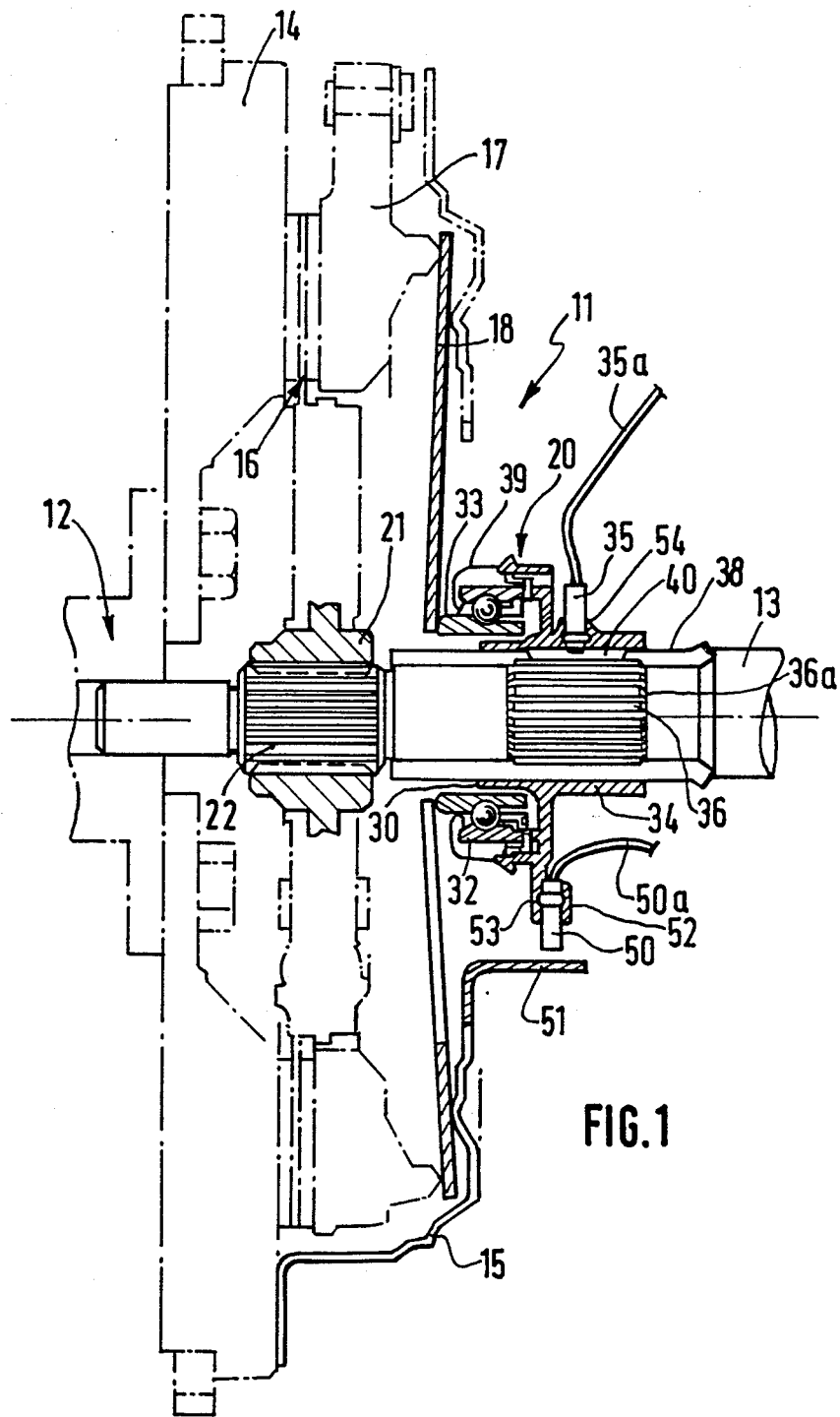
FIG. 1 is a somewhat diagrammatic view of a clutch unit in accordance with the invention, seen in cross section on a diameter passing through its longitudinal axis.
Figure 2:
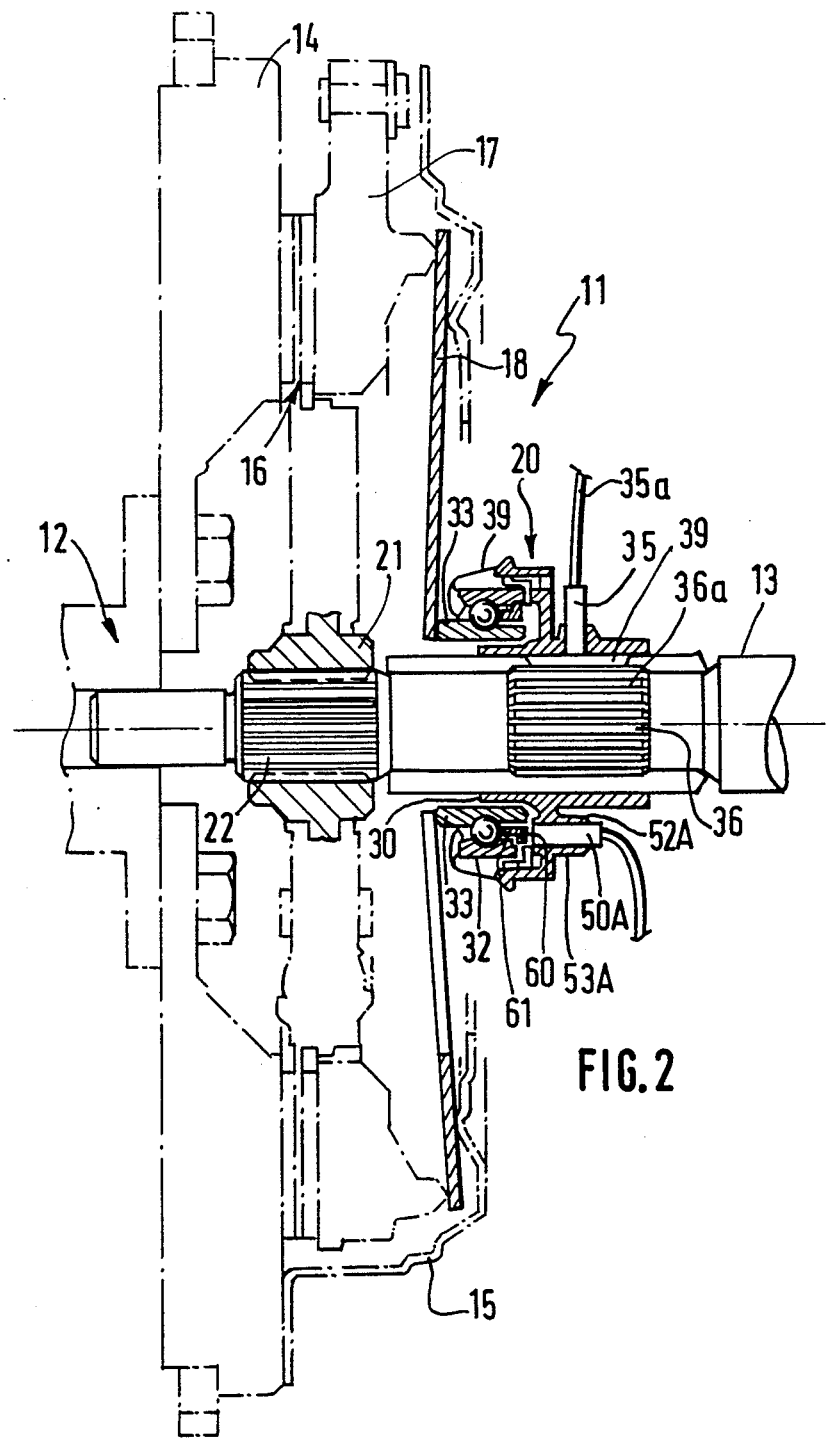
FIG. 2 is a view of a circular clutch unit, illustrating another embodiment of the invention.

Both FIGS. 1 and 2 show a clutch unit 11 installed between two shafts which are mounted end to end on a common axis, namely a driving shaft 12 and a driven shaft 13. The driving shaft 12 in this example consists of the outer end of the crank shaft of an internal combustion engine, while the driven shaft 13 is the input shaft of a gearbox. The clutch unit is generally conventional and of the friction type. Its main components are a reaction plate 14 fixed to the driving shaft 12, an external annular member 15 made in pressed metal plate, conventionally called a cover plate and fixed to the reaction plate 14, a friction disc 16 fixed with respect to the driven shaft 13 so as to rotate with it, a pressure plate 17 which is rotatable with the cover plate 15 but which is also axially moveable with respect to the latter, and finally a resilient actuating means 18 which acts as a spring and which in this example comprises a diaphragm.

The diaphragm 18 is interposed between the pressure plate 17 and the cover plate 15, so that when the diaphragm is deformed it urges the pressure plate 17 towards the reaction plate 14 in such a way as to drive the friction disc 16 in rotation by gripping it between the plates 14 and 17. It will be noted that the diaphragm has a plurality of fingers which act as declutching levers. The diaphragm 18 is deformed by an axial thrust in its central region, exerted by a declutching member 20 which is mounted coaxially with the driven shaft 13 and which is moveable in the axial direction along the latter. Most of the elements which have just been briefly described above, and which are not in themselves directly relevant to the invention, are indicated merely by phantom lines in FIG. 1. The friction disc 16 includes a central hub 21 which has internal splines cooperating with splines, constituting a driving pinion 22, cut on the shaft 13, so as to couple the shaft 13 and the friction disc 16 for rotation together while allowing the friction disc to slide along the driven shaft 13. The declutching member 20 is displaced axially in known manner, by pivoting movement of a control member (not shown) of the kind usually called a fork. The fork is connected to an actuating mechanism not shown, which may for example be an electric motor as described in French Pat. No. 2 523 743.

The declutching member 20 includes a maneuvering element 30, on which a bonnet 39 is fixed by clips or by a force fit, for connection of a declutching element comprising a ball bearing 32 in a manner to be described below. One ring of the bearing 32, in this example the inner ring 33, has a tubular axial extension through which it cooperates with the central part of the diaphragm 18 by endwise engagement with the latter. The manoeuvring element 30 has a cylindrical portion or sleeve 34 which slides on a fixed tubular support member or horn 38, surrounding the driven shaft and mounted on the gearbox casing (not shown). In this example, the declutching member is held automatically centred, and the bonnet 39 is resilient and fastens the manoeuvring element 30 and the ball bearing 32 together.

It is within the scope of the invention to omit the fixed tubular support 38: in that case, the declutching member may be carried by the fork itself, or be connected by means of tongues, either to the diaphragm 18 or to the gearbox casing, as described in French Pat. Nos. 2 531 511, 2 533 650 and 2 376 335 respectively.

In accordance with the invention, the manoeuvring element 30 of the declutching member 20 carries two speed sensors 50 and 35, which are respectively sensitive to the rotational velocity of the driving shaft 12 and that of the driven shaft 13.

In this example, the speed sensor 50 is oriented towards a sensed element in the form of an axial rotating index member 51 which is formed by Pressing out a radial extension from the central portion of the cover plate 15, being directed towards its central opening and then bent outwards by 90° towards the exterior of the cover plate 15, so as to constitute a finger directed parallel to the longitudinal axis of the driven shaft 13. The economy of this arrangement will be appreciated, since the finger 51 is formed from material which would normally be wasted. The finger or index 51 of the cover plate 15, which may of course be a separate member carried by the cover plate if desired, is thus rotated at the same speed as the latter, and therefore at the same speed as the driving shaft 12. It thus passes alternately in front of the sensor 50 at a frequency proportional to the velocitY cf rotation of the shaft 12. The sensor 50 is mounted in this example in a hole 52 formed in a radial extension integral with the manoeuvring element 20 on an axis perpendicular to the longitudinal axis of the element 30.

It should be noted that such an arrangement has the advantage that it obtains a constant spacing between the index 51 and the sensor 50, so that the relative displacement between them in the axial direction is parallel.

It will also be noted that the manoeuvring element 30 is preferably made in plastics material, and that the sensor 50 may be provided with a housing having a protective seal, so that the sensor can be mounted using suitable clips in an opening formed in the extension 53.

In accordance with the invention, the manoeuvring element 30 of the declutching member 20 also carries a second speed sensor 35, which is oriented towards the driven shaft 13. In this example the second sensor 35 is diametrically opposed to the first sensor 50 In the example shown, the sensor 35 is mounted in a corresponding opening 54 through which it extends so as to face into an oblong hole 40 formed through the wall of the tubular support member 38.

The sensor 35 is mounted in a similar way to the sensor 50 Both sensors may be of the variable reluctance type.

To cooperate with the sensor 35, the driven shaft 13 carries, or includes, at least one sensed element, or which may be a structural feature of the shaft, to which the sensor 35 will respond In this example, this comprises a kind of pinion 36, comprising a plurality of ribs 36a which are disposed at regular intervals circumferentially around the shaft 13, and define grooves between them, and which extend over at least the length of that portion of the driven shaft 13 over which the sensor 35, carried by the declutching member 20, is axially moveable. It is for this reason that the sensor 35 is for example of the variable reluctance type. Since it exists for the purpose of measuring the speed of rotation of the shaft 13, the "pinion" 36 may of course comprise only one single longitudinal rib, or one single groove. In the example shown, the plurality of ribs 36a leads to greater precision in the measurement of shaft speed, but primarily the pinion 36 and the driving pinion 22 are similar and comprise riblike elements aligned longitudinally with each other, so that they can be cut in similar operations. Manufacture of the driven shaft 13 is then not substantially complicated by adapting it for the purposes of the present invention. It is also possible to cut one single drive pinion 22, longer than is strictly necessary in order to ensure coupling with the friction disc 16 and longitudinal displacement of the latter, so that the additional length provides the sensed element for the sensor 35.

Other structural features can of course be associated with the shafts 13 and 12, giving rise to different physical phenomena, provided that the sensors 50 and 35 (which will be chosen having regard to the particular physical phenomenon employed) are capable of delivering at their electrical outputs, 50a and 35a, pulse signals representing the respective shaft speeds The outputs 50a and 35a may be connected to electronic means, not shown for calculating the shaft speeds, or to an electronic circuit for processing the pulsed output signals from the sensors. Such an electronic circuit maY for example form part of an automatic clutch control system of the kind mentioned above. In the examples described, in which the manoeuvring element 30 of the declutching member 20 slides on the fixed tubular support 38, the latter has the longitudinally oriented oblong hole 40 formed facing the sensed element or structural feature mentioned above to which the sensor 35 is responsive, and the sensor can be either oriented towards the oblong hole 40 or engaged within it.

The arrangement which has just been described may be used with minimal modification to obtain other useful information on the operation of the clutch unit, or on its state, for example with respect to the extent of wear in the friction material of the friction disc 16. In fact, the location of the sensor 35 with respect to the pinion 36 (with the clutch engaged) varies progressively as a function of the wear that takes place in the friction material. Accordingly the pinion 36 is made slightly conical in the longitudinal direction, so that the amplitude of the output signals from the sensor 35, representing shaft speed, varies progressively over a period of time as the friction disc suffers progressive wear.

The amplitude of the output signals will increase until it reaches a certain predetermined level, and this information can be used for activating a suitable warning device to indicate that the friction disc 16 is ready to be replaced. The conicity of the pinion can of course be the other way round, so as to diminish the amplitude of the output signals over the same period of time.

Referring now to FIG. 2, the modified clutch unit shown therein differs from that of FIG. 1 essentially in that the speed sensor 50A of the driving shaft 12 is oriented generally towards the ball bearing 32. Accordingly, a hole 52A is formed in an extension 53A of the manoeuvring element 30, the hole 52A being oriented parallel to the longitudinal axis of the element 30 so as to lie opposite a sensed element which here comprises an index 60, which is preferably disposed on the cage 61 of the bearing 32.

It should also be noted that the index 60 may be and preferably is, constituted by the poles of (or the intervals between) the balls themselves, or by equivalent features of the cage 61 which encloses the balls and which follows the shape of the balls to ensure that they are maintained in position and in the correct spacing during operation. It will be clear from the above description that the rotating finger or other sensed element (e.g. the index 51 in FIG. 1 or 60 in FIG. 2) constitutes a "target" for the sensor The present invention is of course not limited to the embodiments described. In particular, the diaphragm can be replaced by coil springs coupled with declutching levers on which the declutching member acts Similarly, the sensors are not necessarily arranged diametrically: they need merely be arranged so as to be spaced from the zones of contact between the fork and the manoeuvring element. The declutching member may be arranged to be moved by pushing, as in the example described above, or by pulling it.

What is claimed is:

1. A power transmission comprising a driving shaft, a driven shaft mounted end to end with the driving shaft on a common axis of rotation therewith, and a clutch unit interposed between said shafts, the clutch unit comprising a reaction plate coupled to the driving shaft for rotation therewith, a cover plate fixed to said reaction plate, a pressure plate coupled with the cover plate for rotation therewith, a friction disc between the reaction plate and the presure plate and coupled in rotation to said driven shaft, resilient biassing means associated with the pressure plate for urging the latter towards the reaction plate to couple the pressure plate and reaction plate together through the friction disc, whereby to engage the clutch so that said driving shaft is coupled with said driven shaft to drive the latter, declutching lever means associated with the resilient biassing means, and a declutching member mounted centrally of the common axis and operatively engaging the declutching lever means to actuate the resilient biassing means for engagement and disengagement of the clutch, wherein the declutching member comprises a maneuvering element and a declutching element carried by the maneuvering element, the clutch unit further comprising means mounting the maneuvering element for axial movement under the action of a control member, and two speed sensors carried by said maneuvering element, each speed sensor being oriented towards a sensed element, selected from said shafts and any element rotatable with said shaft, each of said sensed elements comprising at least one element to which the respective sensor is responsive.

2. A power transmission according to claim 1, wherein said sensed element oriented towards one of said speed sensors associated with the driving shaft comprises a rotatable finger projecting from the cover plate so as to be rotatable with the reaction plate.

3. A power transmission according to claim 2, wherein the said rotatable finger is an integral extension of the cover plate, so formed as to constitute an index finger directed parallel to the longitudinal axis of the driven shaft, and being located so as to pass in front of the speed sensor associated with the driving shaft when the driving shaft rotates, said speed sensor being mounted on the maneuvering element so as to be substantially perpendicular to the longitudinal axis of the maneuvering element.

4. A power transmission according to claim 1, wherein the said declutching element comprises a ball bearing including bearing elements so disposed as to rotate with the resilient biassing means of the clutch unit when the resilient biassing means is caused to rotate by the action of the maneuvering element, said sensed element, towards which the speed sensor associated with the driving shaft is oriented, comprises index means forming part of or carried by one of said bearing elements.

5. A power transmission according to claim 4, wherein said index means comprises an index disposed on a retaining cage of said ball bearing.

6. A power transmission according to claim 1, wherein the driven shaft has at least one longitudinal rib or groove extending at least over the length of that portion of the driven shaft over which one of said speed sensors associated with the driven shaft is axially moveable.

7. A power transmission according to claim 1, further comprising a fixed, tubular support member surrounding said driven shaft, the declutching member being slideably mounted on a sliding surface defined by said support member, the latter having an oblong through hole oriented longitudinally and aligned with that one of said sensed elements to which the speed sensor associated with the driven shaft is responsive, this sensor being oriented towards said oblong hole or engaged therein.

8. A power transmission according to claim 1, wherein the speed sensors are of the variable reluctance type.

9. A power transmission according to claim 1, wherein the speed sensors are connected with electronic means for calculating the speed of said driving and driven shafts.

* * * * *